(12) United States Patent
Mayer (10) Patent No.: US 8,013,761 B2
(45) Date of Patent: Sep. 6, 2011

(54) SWITCHING MATRIX FOR AN INPUT DEVICE

(75) Inventor: Walter Mayer, Brühl (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1989 days.

(21) Appl. No.: 11/011,966

(22) Filed: Dec. 14, 2004

(65) Prior Publication Data

US 2005/0169256 A1   Aug. 4, 2005

(30) Foreign Application Priority Data

Dec. 16, 2003   (DE) .................................. 103 60 241

(51) Int. Cl.
  *H03M 11/00* (2006.01)

(52) U.S. Cl. ......... 341/26; 340/14.1; 326/105; 345/168; 341/20

(58) Field of Classification Search .................... 341/20, 341/26; 346/168; 340/14.1; 326/105
See application file for complete search history.

(56) References Cited

U.S. PATENT DOCUMENTS

| | | | |
|---|---|---|---|
| 4,344,069 A * | 8/1982 | Prame .............................. | 341/26 |
| 4,607,251 A | 8/1986 | Takekoshi | |
| 4,906,993 A * | 3/1990 | Freeman et al. ................ | 341/26 |
| 5,448,236 A | 9/1995 | Shiga | |
| 5,798,716 A * | 8/1998 | Davis .............................. | 341/26 |
| 5,877,709 A | 3/1999 | Ala-Lehtimäki et al. | |
| 6,020,833 A | 2/2000 | Chang et al. | |

FOREIGN PATENT DOCUMENTS

GB         1 562 714        9/1976

* cited by examiner

*Primary Examiner* — Albert K Wong
(74) *Attorney, Agent, or Firm* — Brinks Hofer Gilson & Lione (57) ABSTRACT

The invention relates to a switching matrix for an input device such as a keyboard or a cursor device for the detection of different switching states. According to the invention the switching matrix has a group electrically connected to a microcontroller, with a plurality of N input and output lines (I/O-lines) with a serially connected terminating resistor to mass each and a group with a plurality of K switching lines with one switching element each. Each switching line connects two of the N I/O lines to each other. The K switching line have an additional series resistor each. According to an interrogation pattern, a first I/O-line as output line is configured with a high potential, a second I/O-line is configured as input line and each further I/O-line as output line is configured with a low potential of the microcontroller.

6 Claims, 7 Drawing Sheets

| LINE-A | LINE-B | LINE-C | LINE-D | LINE-E | LINE-F | related key bit |
|--------|--------|--------|--------|--------|--------|-----------------|
| H | I | L | L | L | L | 4.1 |
| I | H | L | L | L | L | 4.1 |
| H | L | I | L | L | L | 4.2 |
| I | L | H | L | L | L | 4.2 |
| H | L | L | I | L | L | 4.3 |
| I | L | L | H | L | L | 4.3 |
| H | L | L | L | I | L | 4.4 |
| I | L | L | L | H | L | 4.4 |
| H | L | L | L | L | I | 4.5 |
| I | L | L | L | L | H | 4.5 |
| L | H | I | L | L | L | 4.6 |
| L | I | H | L | L | L | 4.6 |
| L | H | L | I | L | L | 4.7 |
| L | I | L | H | L | L | 4.7 |
| L | H | L | L | I | L | 4.8 |
| L | I | L | L | H | L | 4.8 |
| L | H | L | L | L | I | 4.9 |
| L | I | L | L | L | H | 4.9 |
| L | L | H | I | L | L | 4.10 |
| L | L | I | H | L | L | 4.10 |
| L | L | H | L | I | L | 4.11 |
| L | L | I | L | H | L | 4.11 |
| L | L | H | L | L | I | 4.12 |
| L | L | I | L | L | H | 4.12 |
| L | L | L | H | I | L | 4.13 |
| L | L | L | I | H | L | 4.13 |
| L | L | L | H | L | I | 4.14 |
| L | L | L | I | L | H | 4.14 |
| L | L | L | L | H | I | 4.15 |
| L | L | L | L | I | H | 4.15 |

SWITCHING MATRIX FOR AN INPUT DEVICE

BACKGROUND OF THE INVENTION

1. Field of the Invention

The invention relates to a switching matrix for an input device such as a keyboard or a cursor device for the detection of various switching states. Particularly, the invention relates to a switching arrangement for the detection of the switching signals when two switching elements of a keyboard are synchronously pressed.

2. Related Technology

To operate electronic products, such as computers often requires input devices equipped with a number of keys, or switching elements, respectively Actuating these pre-assigned or freely configurable switching elements triggers electronic signals, which are processed by a microcontroller and then transformed into an operation desired by a user.

Not rarely, more than one of the keys of the keyboard are accidentally or deliberately pressed at the same time, which leads to problems detecting the switching signals, which possibly superimpose. The state-of-the-art knows various solutions to detect the switching states of synchronously actuated switching elements demanding more or less technical effort.

From U.S. Pat. No. 6,020,833 a process and an interface for the detection of switching states of keys and resistors of a keyboard are known. The interface includes a unit with several input and output lines. Some of the input and output lines are coupled with the switching lines, in order to establish a switching matrix. Switching elements are placed at nodes of the switching lines and the output lines, and between a switching line and an output line and associated resistor is placed.

Further, from U.S. Pat. No. 4,607,251 a system for the detection of closed contacts of a reed-like switch is known. In this system the switching elements are connected in parallel with the resistors to increase the electric potential of the switching lines. These switching elements are suitable to acceleratingly rotate the electric potential of the switching lines. In this way closed contacts can be correctly detected when the operational speed is increased.

In U.S. Pat. No. 5,448,236 a circuit for the detection of several synchronously pressed keys is disclosed. Hereby, the circuit consists of a number of switching elements that are matrix-like connected to a number of output lines and control lines by switching lines. Each switching element has a series-connected additional resistor. Additionally, each output line is connected to a device for the measurement of the electrical current.

Common to the above mentioned inventions is the not insignificant demand of electric components to reduce the required input and output lines.

The problem of the invention is to develop a switching matrix for the detection of switching states of one, two or more synchronously actuated switching element(s) that requires less input and output lines for the microcontroller and can be manufactured cost-effectively.

SUMMARY

According to the invention, this problem is solved by the features of a switching matrix for the detection of switching states and by the features of a process for the detection of switching states as discussed herein.

The invention provides that the switching matrix for an input device. Particularly, a keyboard or a cursor device, for the detection of switching states of one, two or more synchronously actuated switching element(s), has a group, electrically connected to a microcontroller, of a plurality of N input and output lines (I/O-lines) with a serially connected terminating resistor to ground each, and a group of plurality of K switching lines with a switching element each. Each switching line connects two of the N I/O-lines. Each K switching line additionally has a series resistor. According to an interrogation pattern, a first I/O-line as output line is configured with a high potential, a second I/O-line is configured as input line and each further I/O-line as output line is configured with a low potential of the microcontroller.

Two interrogation patterns are provided for the detection of a switching state, whereby two I/O-lines connected to the switching line of the actuated switching element can be alternatively configured as output line with a high potential or as input line. The I/O-lines not connected to the switching line of the switching element to be checked are configured as output line with a low potential of the microcontroller.

Because if only two I/O-lines are used, only one switching line with an associated switching element and a series resistor can be arranged between the I/O-lines, the number N of the I/O-lines must be at least three. Three I/O-lines allow up to three switching lines with an associated switching element and a series resistor to be used.

The maximum number of K switching lines with the number of N switching elements, which are capable to be coupled with the number of N I/O-lines, correspond to the equation $K=(N/2)*(N-1)$.

The amounts of the terminating resistors of the N I/O-lines switched to ground are significantly greater than the amounts of the series resistors of the K switching lines. Preferably, the amount of each single terminating resistor is a multiple of the amount of the series resistors.

Switches, key switches, relays and the like can be provided as switching elements.

According to the principles of the invention, the process for the detection of the switching states of one, two or more synchronously actuated switching element(s) of an input device, particularly a keyboard or a cursor device, includes, using a group electrically connected to a microcontroller of a plurality of N input and output lines (I/O-lines) with a serially connected terminating resistor to ground each, and a group of a plurality of K switching lines with a switching element and a series resistor each, whereby each switching line connects two of the N I/O-lines to each other, the process steps described in the following:

(A) providing a bit for each of the N switching elements (4.1 to 4.N) and setting the key status bit to 0 for each of the N switching elements (4.1 to 4. N);
(B) setting all output registers to 0;
(C) setting all direction registers to output;
(D) passing through an external loop, whereby the number of loop passes corresponds to the number of N I/O-lines (5.1 to 5.N);
(E) passing through an internal loop, whereby the number of loop passes corresponds to the number of the N switching elements (4.1 to 4.N) and two interrogation patterns per switching element (4.N) are interrogated in each case;
(F) evaluation of the input signals and detection of the switching signals by an OR relation of the key status bit to the new output signal; and
(G) checking whether there is a permissible key combination.

This process essentially includes a main routine and at least one subroutine, but preferably four subroutines.

Significant features and advantages of the invention essentially include, without limitation, a very small number of I/O-lines required; in addition to single and double key strokes, multiple key strokes can also be detected; and an especially cost-effective switching matrix due to the use of resistor arrays, or printed resistors, respectively.

BRIEF DESCRIPTION OF THE DRAWINGS

Further details, features and advantages of this invention will become apparent from the following description of an embodiment with reference to the associated drawings.

DETAILED DESCRIPTION

Figure 1:
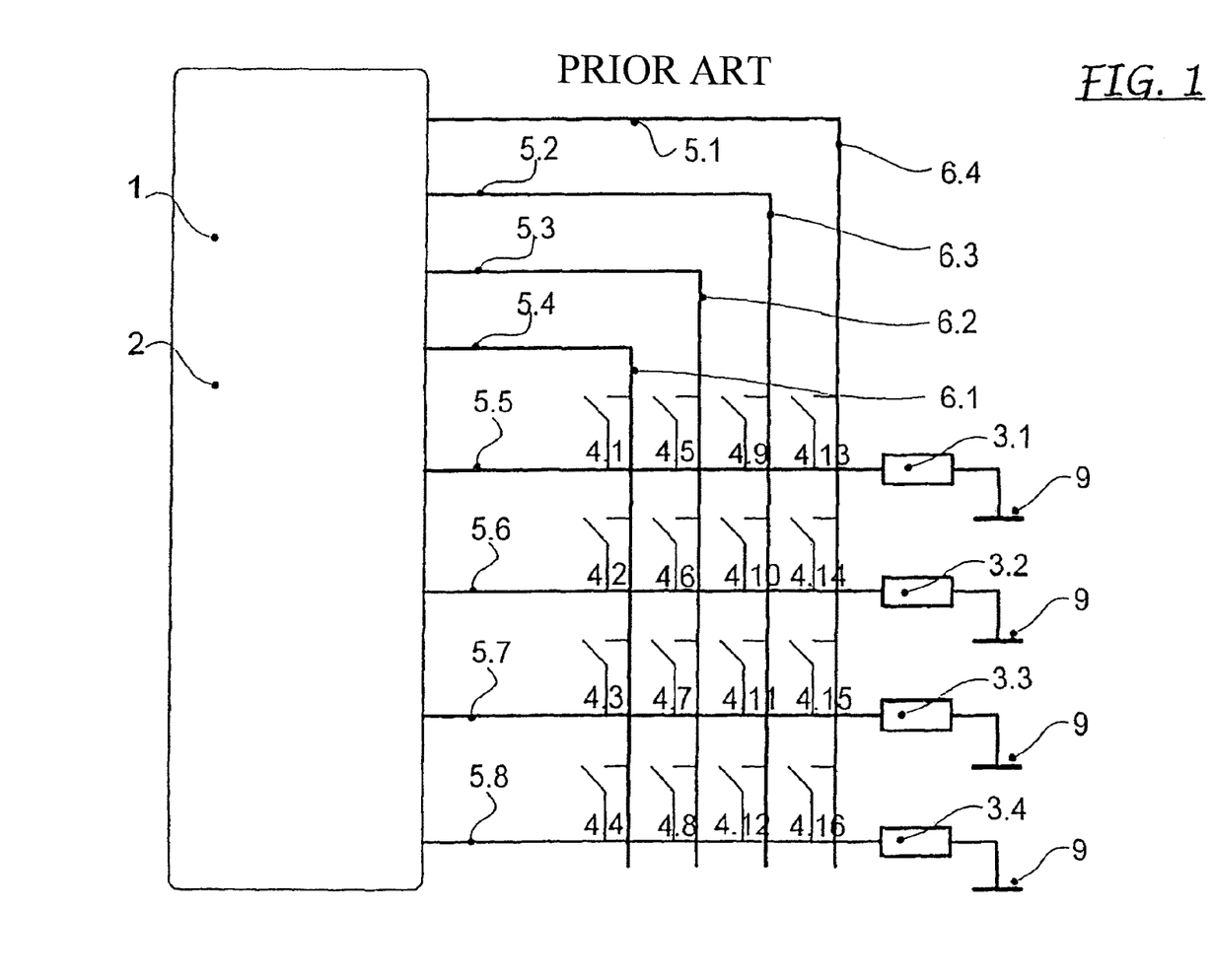
FIG. 1 illustrates a switching matrix of the state-of-the-art.

Referring now to the drawings, FIG. 1 illustrates schematically a switching matrix of the state-of-the-art. To detect the switching states eight input and output lines (I/O-lines) 5.1 to 5.8 (generally referred to as I/O lines 5) of a microcontroller 1, having a voltage source 2, are provided whereby the top, in the example shown, four I/O-lines 5.1 to 5.4 are coupled to four switching lines 6.1 to 6.4 (generally referred to as switching lines 6). Each of these four switching lines 6.1 to 6.4 has four switching elements (generally referred to as switching elements 4) and therefore is electrically connected to the bottom, in the example shown, four I/O-lines 5.5 to 5.8. Further the bottom four I/O-lines 5.5 to 5.8 have a terminating resistor 3.1 to 3.4 to ground 9. Therefore, to switch, or detect, respectively, sixteen switching elements 4, eight I/O-lines 5.1 to 5.8 are required. When the switching element 4.1 is actuated, a signal flows from the microcontroller over the output line 5.4, then over the switching element 4.1 and the input line 5.5 back to the microcontroller. On principle, the input line 5.5 can also be configured as output line. The microcontroller 1 is capable to distinguish between the actuation of a single switching element 4 and synchronous actuation of two switching elements 4.

Figure 2:
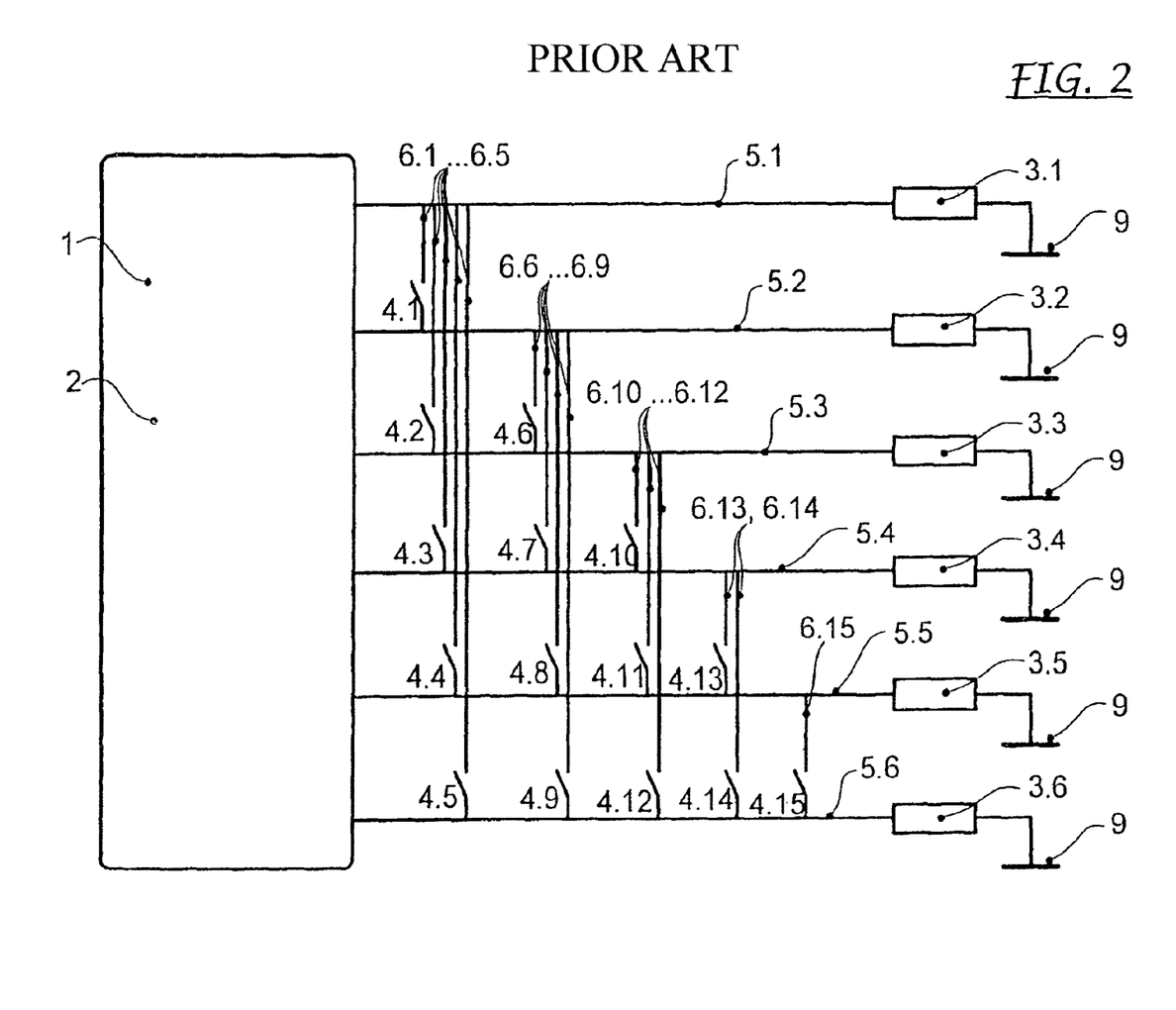
FIG. 2 illustrates a switching matrix of the state-of-the-art in the shape of a triangle.

FIG. 2 illustrates a further switching matrix of the state-of-the-art with a triangular shape. Here six I/O-lines 5.1 to 5.6 (generally referred to as I/O lines 5) are provided, the first ends of which are connected to the microcontroller 1 and the second ends of which are connected to the mass 9. Each of these I/O-lines 5.1 to 5.6 again has a terminating resistor 3.1 to 3.6 connected to the ground 9. To switch, or detect, respectively, fifteen switching elements (generally referred to as switching elements 4) a group of a plurality of K switching lines with one switching element 4 in each case provided, whereby each switching line connects two I/O 5.1 to 5.6 to each other. Compared to the switching matrix in FIG. 1, this arrangement reduces the number of the required I/O-lines 5 at the microcontroller 1. This arrangement is particularly advantageous, if a two-board design is used. In a two-board design the microcontroller 1 and the key matrix are placed on different boards so that connector pins can be saved. The microcontroller 1 interrogates the key matrix by switching each I/O-line 5 as output one after the other and reading-in the states of the other I/O-lines 5 at the microcontroller 1. To detect an individually actuated switching element 4 all I/O-lines 5 connected to the microcontroller 1 are switched as output one after the other and the corresponding bit patterns of the other I/O-lines 5 are read in. As there is usually no measurable voltage drop over the switching elements 4 in the switching lines 6, some double key actuations cannot be detected. So, synchronous actuation of the switching elements 4.1 and 4.2 produces the same signal pattern as the synchronous actuation of the switching elements 4.1 and 4.6. This is caused by the fact that the I/O-lines 5.1, 5.2 and 5.3 take the same electrical potential.

Figure 3:
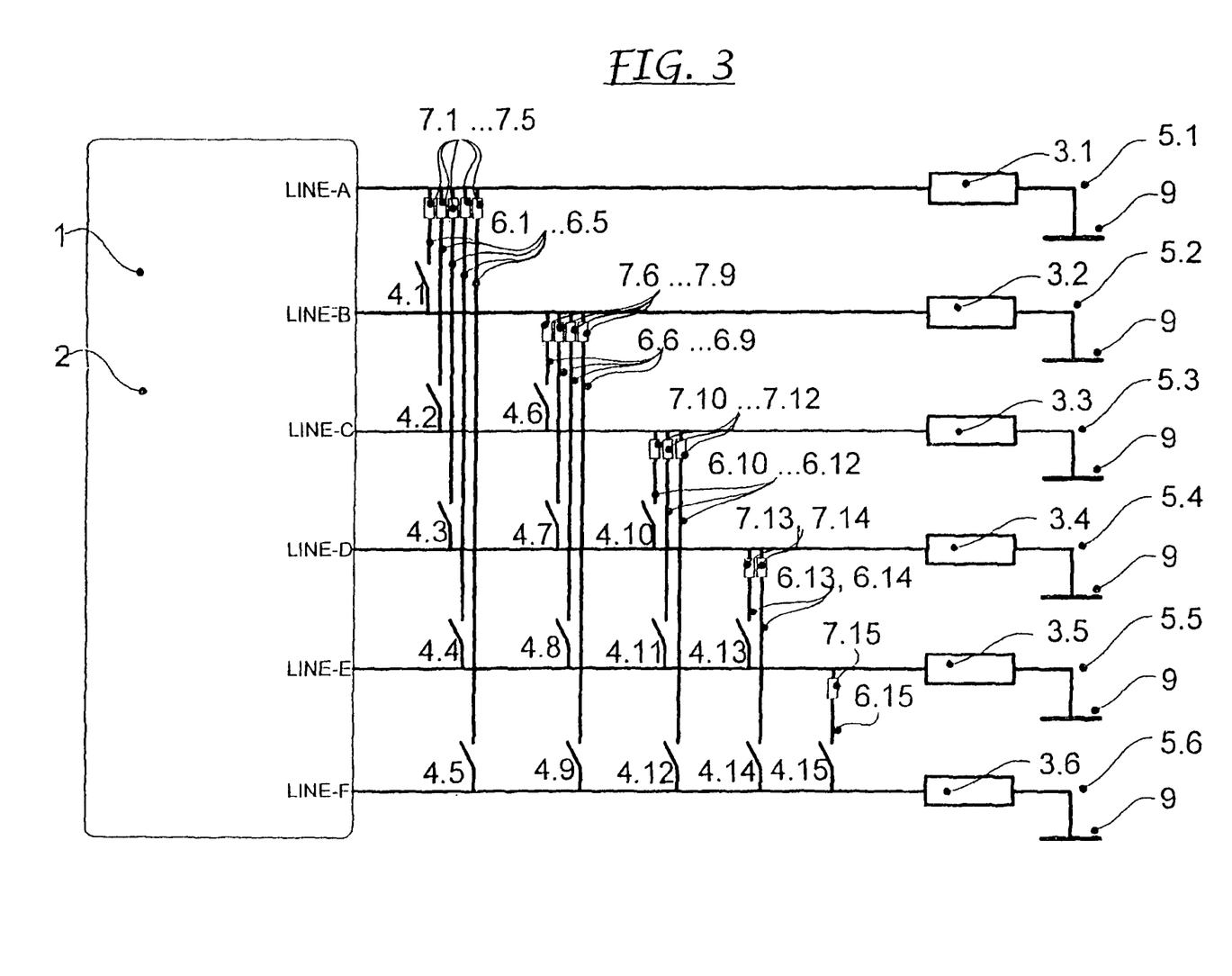
FIG. 3 illustrates a switching matrix of the invention, each switching line with one switching element each and a series-connected resistor.

The switching matrix of the invention is shown in FIG. 3, whereby the basic structure, i.e. the arrangement of the I/O-lines 5, is equal to that in FIG. 2. Again six I/O lines 5.1 to 5.6 are provided that are connected to the microcontroller 1 on the one hand and to ground 9 on the other hand. Each of these I/O-lines 5 has a terminating resistor 3.1 to 3.6 to mass 9. These terminating resistors 3.1 to 3.6 have exemplarily a resistance of 100 kOhm and pull the I/O-lines 5.1 to 5.6 to a low potential as long as no switching element (generally referred to as switching element) 4 is actuated and a corresponding I/O-line 5 is switched as input.

To switch, or detect, respectively, fifteen switching elements 4, a group of a plurality of switching lines 6 with one switching element 4 in each case is provided, whereby each switching line 6 connects two I/O-lines 5.1 to 5.6 to each other. The significant and hence distinctive feature compared to the representation in FIG. 2 is the series resistor 7, which is serially arranged to each switching element 4 and therefore produces a measurable voltage drop when a switching element 4 is actuated. Each of these switching lines 6.1 to 6.15 has, preferably, a series resistor 7.1 to 7.15 with a resistance of 10 kOhm. These series resistors 7.1 to 7.15 prevent a short circuit, when one of these I/O-lines 5 is switched to high potential and another I/O-line 5 to low potential and switching elements 4 are actuated, when are arranged in the switching lines 6 that connect these two I/O-lines 5 to each other. Each switching line 6 that connects two I/O-lines 5 to each other thus has an associated switching element 4 and an associated series resistor 7. Therefore the individual switching elements 4 can be decoupled from each other. The entirety of the series resistors 7 is exemplarily configured as a resistor array. The interrogation method described below allows the detection of the actuation of individual switching elements 4, the synchronous actuation of two switching elements 4 and, if necessary, the synchronous actuation of several switching elements 4. Detection of several switching elements 4 that are actuated synchronously can be realized absolutely certain, if the pressed switching elements 4 are in one row or column.

A group of switching lines 6 is referred to as a column when the series resistor ends of the switching lines 6 are coupled to a common I/O-line 5. an example is the arrangement of the switching lines 6.10 to 6.12 with the switching elements 4.10 to 4.12. On the other hand, a group of switching lines 6 is referred to as a row when the switch ends of the switching lines 6 are couple to a common I/O-line 5. an example is the switching lines 6.4, 6.8, 6.11 and 6.13 with their associated switching elements 4.4, 4.8, 4.11, 4.13.

For each reading-out step, now one of the I/O-lines 5 is set to output with high potential, another I/O-line 5 to input and all other I/O-lines 5 output with low potential. The input line and the output line with high potential can also be mutually exchanged so that for each switching element 4 two reading-out processes, or interrogation patterns, respectively, are provided.

When an individual switching element 4, for example, the switching element 4.1 is actuated then, on the one hand, Line-A can be set to high potential, Line-B to input and Line-C to Line-F to output with low potential. On the other hand, Line-A can be set to input, Line-B to output with high potential and Line-C to Line-F to low potential.

In both cases a high-potential—logic one—is recorded at the input line, i.e. optionally Line-A or Line-B, when the switching element 4.1 is actuated.

When two synchronously actuated switching elements 4, for example, the switching elements 4.1 and 4.2, are actuated, the reading-out process mentioned above is run for each of the actuated switching elements 4.1 and 4.2. In the first case, the reading-out process for the switching element 4.1, Line-A, on the one hand, can be set to high potential, Line-B to input and Line-C to Line-F to output with low potential. In this variant a high potential—logic one—will be read in at the input of the microcontroller 1.

On the other hand, Line-A can be set to input, Line-B to output with high potential and Line-C to Line-F to low potential. In this variant, at the input line of the microcontroller 1, a high potential—logic one—or a low potential—logic 0—will result when the switching element 4.1 is actuated. Because of the series connection of both series resistors 7.1, 7.3 in the sense of a voltage divider, Line-A will be at approximately half of the supply voltage of the microcontroller 1.

In case several switching elements 4 should be actuated synchronously, the reading-out process is realized as follows. On the one hand, Line-A is set to high potential, Line-B to input and Line-C to Line-F to output with low potential. On the other hand, Line-A can be set to input, Line-B to output with high potential and Line-C to Line-F to low potential. In both cases, a low potential—logic 0—will result at the input line when the switching element 4.1 is not actuated.

In summary it may be said that during synchronous actuation of two switching elements 4 for each switching element 4 a correct input signal and an undefined input signal coupled to a second switching element 4 is detected by the microcontroller 1. While a node line between two actuated switching elements 4 is set to a high potential, a correct switching signal can be read back at both other I/O-lines 5. If for two actuated switching elements 4 the node line is switched as input, only an undefined signal can be read back. In the latter case the input signal is at half of the supply potential and is undefined for the digital input of the microcontroller 1. Further, it may be said when a switching element 4 is not actuated, both reading-in processes for this switching element 4 deliver only a low potential—logic 0. To detect several synchronously actuated switching elements 4 requires that all permissible key combinations form only one node with the other combinations at a switching element 4.

Figure 4:
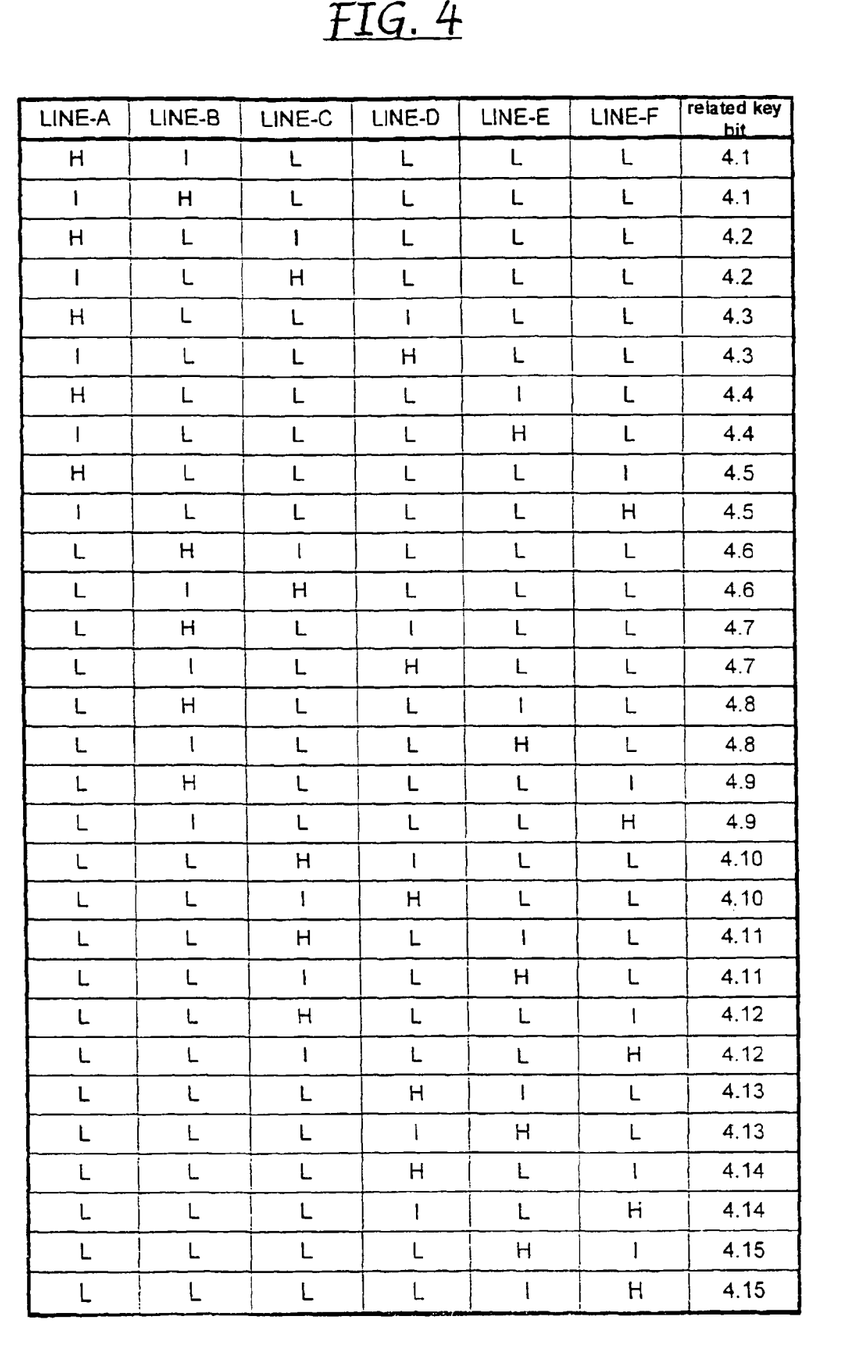
FIG. 4 illustrates a table of all switching states with two interrogation patterns each.

In the table of FIG. 4 all switching states are shown which can result at the most for an example of fifteen switching elements 4 and six I/O-lines (Line-A to Line-F) 5 with two interrogation patterns per switching element 4 each. Hence the microcontroller 1 has to detect and process a maximum of 30 different switching states. The number of variants of possible switching states results from the equation $$V = 2*K \text{ with } K=(N/2)*(N-1)$$

or $V=N(N-1)$, respectively, where N is the elements, or the number of I/O-lines 5, and K is the class, or the input or output signal. Hence, with LINE-A to LINE-F (six elements), which per switching state each have one input, one output with high potential and four outputs with low potential (two classes), according to the above equations $$V=6(6-1)=30$$

switching states follow. Thus for eight I/O-lines 5, for example, a maximum number of switching states of fifty six result, whereby twenty eight switching elements 4 maximum can be electrically connected to the eight I/O-lines 5.

In the headline of the table Line-A to Line-F are listed, whereby these lines correspond to the I/O-lines 5.1 to 5.6. The ends of the rows written in the right column indicate the switching elements 4.1 to 4.15, whereby two interrogation patterns, or switching states, respectively, per switching element are interrogated.

To facilitate understanding of the FIG. 5 to FIG. 9 described below, the following variables are defined:
  N input (I)- and output (O) lines of the microcontroller,
  K maximum number of the keys/switching elements and switching lines of an input device,
  TS [1 . . . K] key status register (1 bit for key status per key),
  IOR [1 . . . N] direction register (1 bit per each I/O-line),
  IN [1 . . . N] input register (1 input bit per line),
  OUT [1 . . . N] output register (1 output bit per line),
  LO control variable for output,
  LI control variable for input,
  I control variable,
  OFFSET intermediate variable for calculation of the key index,
  INDEX intermediate variable for the key index.

Figure 5:
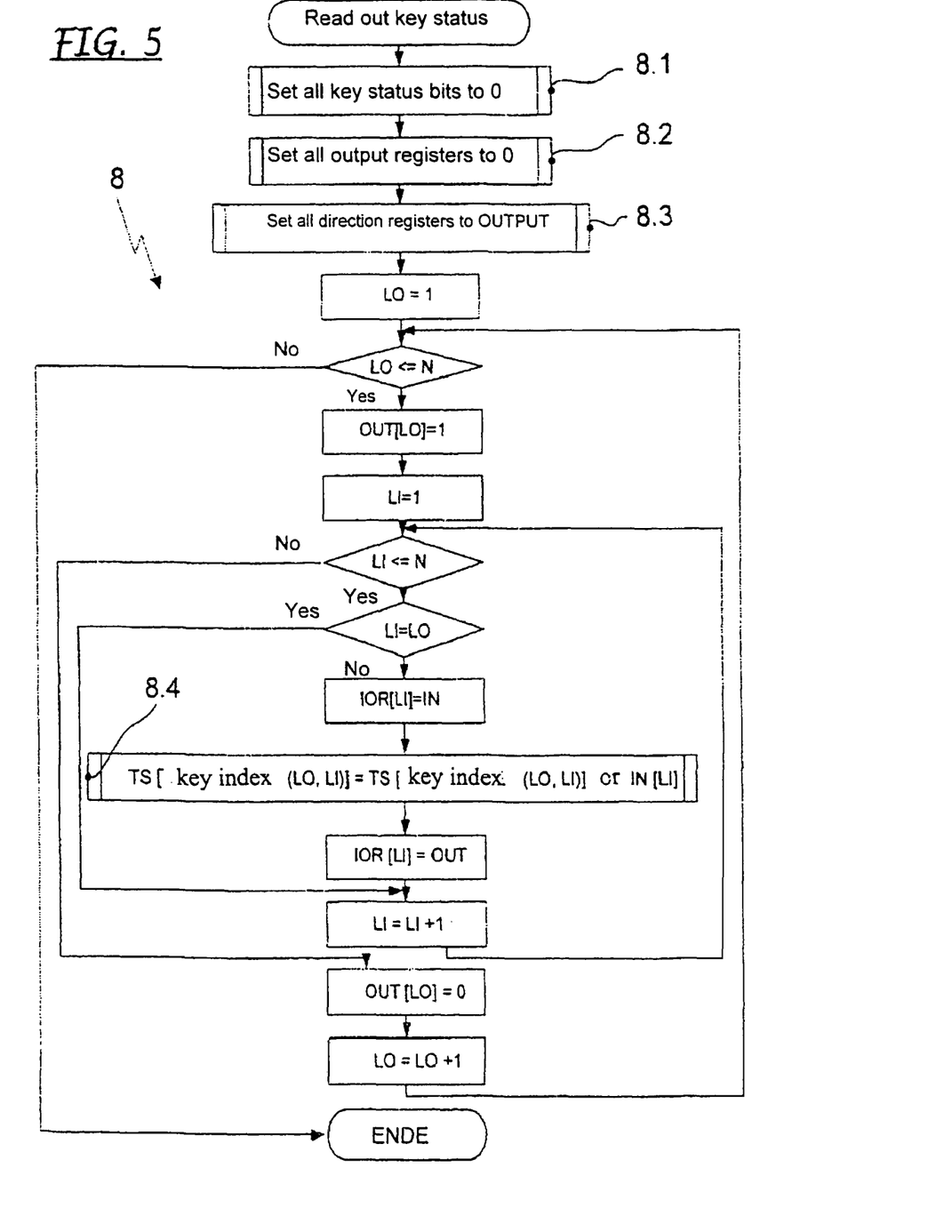
FIG. 5 illustrates a program flow diagram of the whole read-out process.

In FIG. 5, the program flow diagram of the main routine for the detection of the switching states is shown schematically. The main routine, apart from an external and an internal loop, includes four subroutines—the subroutine for the setting of all key status bits TS [1 . . . K] 8.1, the subroutine for the setting of the output registers OUT [1 . . . N] 8.2, the subroutine for the setting of the direction registers IOR [1 . . . N] 8.3 and the subroutine for the determination of the key index INDEX 8.4. After execution of the subroutines 8.1 to 8.3 the control variable for the output LO is given the value one, whereby the step rate, or the quantization step for each pass of the external loop is one. The external loop is repeated until the value of the control variable LO for the output is bigger than the value of the read I/O-lines 5. As long as the value of the control variable LO is smaller, an internal loop is passed for each output register of the I/O-lines 5, wherein the key index is interrogated. By means of the main routine all possible switching states are recorded with two interrogation patterns each for each key 4, or switching element, so that the actuated switching elements 4 will be unambiguously detected.

Figure 6:
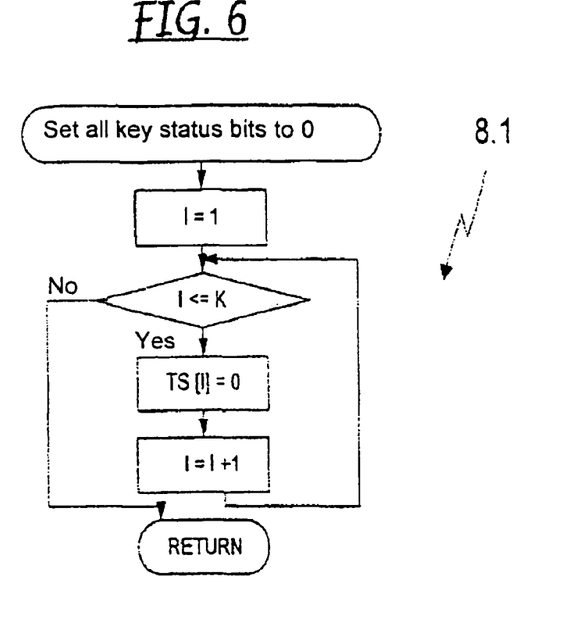
FIG. 6 illustrates a program flow diagram of the subroutine Key status bits.

FIG. 6 illustrates a program flow diagram of a first subroutine for setting all key status bits TS [1 . . . K] 8.1 to the value zero. The general control variable I is first set to the value one. The following loop is repeated for the entirety of all switching elements 4 one to K only until the general control variable I takes a value greater than given by the maximum number of the K switching elements 4. The general control variable I increases after each pass through the loop by the value one. Within the loop the key status bits TS of all keys [1 . . . K] are set to the value zero.

Figure 7:
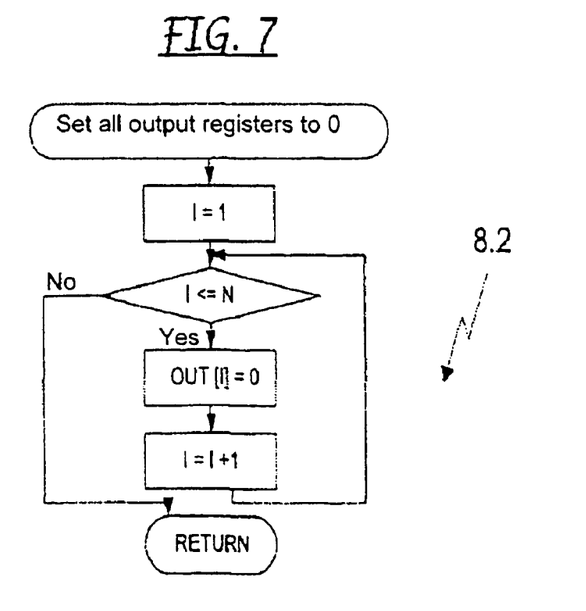
FIG. 7 illustrates a program flow diagram of the subroutine Output register.

FIG. 7 illustrates a program flow diagram of a second subroutine for setting the output registers OUT [1 . . . N] 8.2 to the value zero. The general control variable I is first set to the value one. The following loop is repeated for the entirety of all I/O-lines 5 only until the general control variable I takes a value greater than given by the maximum number of the N I/O-lines 5. The general control variable I increases after each pass through the loop by the value one. Within the loop all output registers of the N I/O-lines 5 are set to the value zero.

Figure 8:
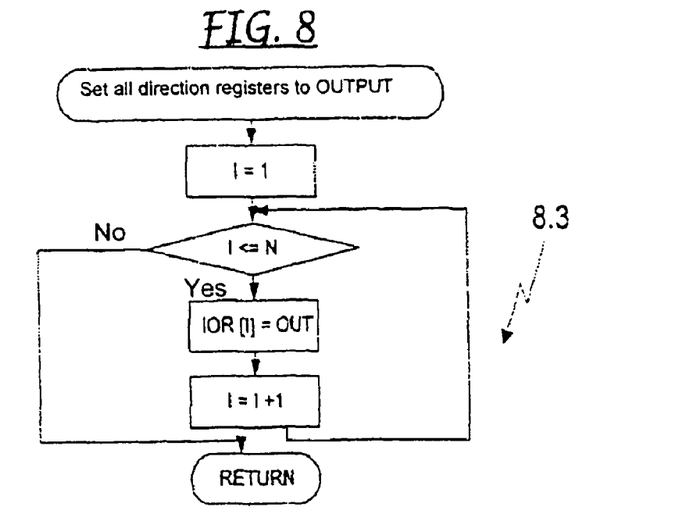
FIG. 8 illustrates a program flow diagram of the subroutine Direction register.

FIG. 8 illustrates a program flow diagram of a third subroutine for setting the direction registers IOR [1 ... N] 8.3 to the value zero. The general control variable I is first set to the value one. The following loop is repeated for the entirety of all I/O-lines 5 only until the general control variable I takes a value greater than given by the maximum number of the N I/O-lines 5. The general control variable I increases after each pass through the loop by the value one. Within the loop all direction registers IOR of the N I/O-lines 5 are set to the value zero.

The abort condition described in the FIGS. 6 to 8 is an abort condition before passing through the loop. It is understood that the abort condition can also be implemented into the respective subroutine 8.1 to 8.3 after passing through the loop.

Figure 9:
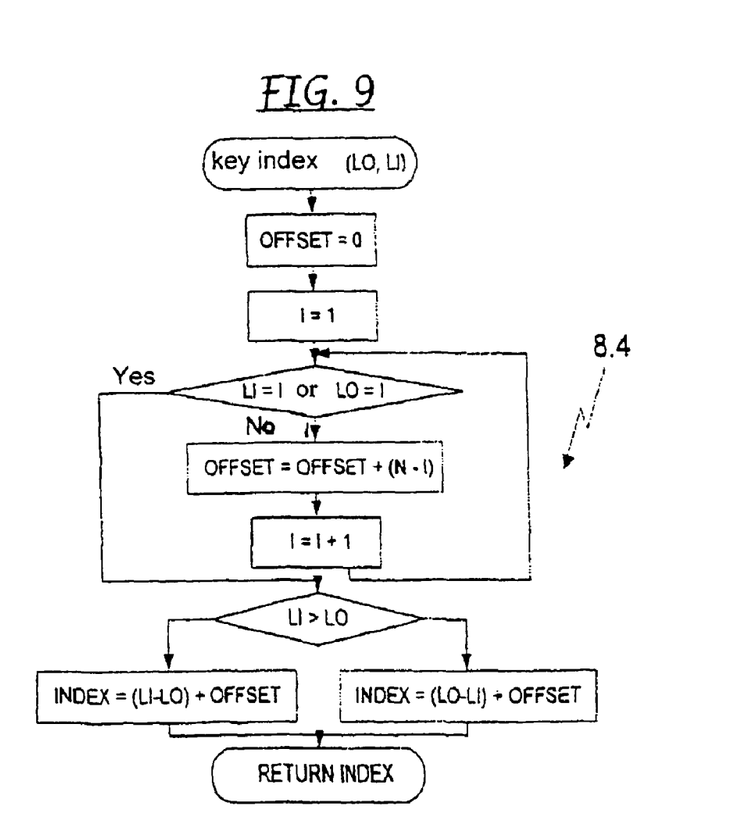
FIG. 9 illustrates a program flow diagram of the subroutine Key index.

FIG. 9 illustrates a program flow diagram of a fourth subroutine for the determination of the key index INDEX 8.4. First the intermediate variable OFFSET for the calculation of the key index INDEX is set to the value zero and the general control variable I to the value one. The following loop is repeated only until the general control variable I reaches the value of the control variable for the input LI or the value of the control variable for the output LO. The general control variable I increases on each pass through the loop by the value one. The current value of the intermediate variable OFFSET results from the sum of the value of the intermediate variable OFFSET of the previous loop pass and the value allocated to the loop pass of the I/O-line 5 reduced by the value of the control variable I. As soon as the previously mentioned abort condition for the loop has been reached, a comparison is made between the values of the control variable LO for the output and control variable LI for the input. Dependent on the result of the check the key index INDEX is determined as follows: In case the control variable LI should have a greater value than the control variable LO, the key index is determined from the sum of the value of the current intermediate variable OFFSET and the difference of the values of the control variables LI and LO. In the opposite case, that is the control variable LO should have a greater value than the control variable LI, the smaller value of the control variable LI is subtracted from the greater value of the control variable LO and added to the value of the current intermediate variable OFFSET.

Summarizing it can be stated that if additional resistors 7 are used which are series-connected to the switching elements 4 of the associated switching lines 6, the number of the I/O-lines 5 required for the detection of individually or synchronously actuated switching elements 4 can be reduced.

It is therefore intended that the foregoing detailed description be regarded as illustrative rather than limiting, and that it be understood that it is the following claims, including all equivalents, that are intended to define the spirit and scope of this invention.

The invention claimed is:

1. A switching matrix for an input device, particularly a keyboard or a cursor device, for the detection of switching states of one, two or several synchronously actuated switching element(s), comprising a group electrically connected to a microcontroller with a plurality of N input and output lines (I/O-lines) with a serially connected terminating resistor to ground each and a group with a plurality of K switching lines with one switching element each, whereby each switching line connects two of the N I/O-lines to each other, wherein the K switching lines have an additional series resistor each and according to an interrogation pattern, a first I/O-line as output line is configured with a high potential, a second I/O-line is configured as input line and each further I/O-line as output line is configured with a low potential of the microcontroller.

2. The switching matrix for an input device of claim 1 characterized in that for the detection of a switching state two interrogation patterns are provided, whereby two I/O-lines connected to the switching line of the actuated switching element are alternatively configured as output line with a high potential or as input line and the I/O-lines not connected to the switching line of the switching element to be checked are configured as output line with a low potential of the microcontroller.

3. The switching matrix for an input device of claim 1 wherein the number N of the I/O-lines (5.1 to 5.N) is at least 3.

4. The switching matrix for an input device of claim 1 wherein the maximum number K of switching lines with the N switching elements; which are coupled with the number N I/O-lines corresponds to the equation $K=(N/2)*(N-1)$.

5. The switching matrix for an input device of claim 1 wherein the amounts of the terminating resistors of the N I/O-lines are significantly greater than the amounts of the series resistors of the K switching lines.

6. A process for the detection of switching states of one, two or more synchronously actuated switching elements of an input device, using a group electrically connected to a microcontroller, with a plurality of N input and output lines with a serially connected terminating resistor to ground each, and a group with a plurality of K switching lines with a switching element and a series resistor each, whereby each switching line connects two of the N I/O-lines to each other, the process comprising the following process steps:
 providing a bit for each of the N switching elements and setting the key status bit to 0 for each of the N switching elements;
 setting all output registers to 0;
 setting all direction registers to output;
 passing through an external loop, whereby the number of loop passes corresponds to the number of N I/O-lines;
 passing through an internal loop, whereby the number of loop passes corresponds to the number of N switching elements and two interrogation patterns per switching elements are interrogated in each case;
 evaluating the input signals and detection of the switching signals by an OR relation of the key status bit to the new input signal; and
 checking whether there is a permissible key combination.

* * * * *